United States Patent
Yamazawa (10) Patent No.: US 8,643,862 B2
(45) Date of Patent: Feb. 4, 2014

(54) DETERMINING BETWEEN A HANDWRITING AND A SOFT KEY INPUT MODE FOR AN IMAGE FORMING APPARATUS

(75) Inventor: Mariko Yamazawa, Osaka (JP)

(73) Assignee: Kyocera Document Solutions Inc. (JP)

( * ) Notice: Subject to any disclaimer, the term of this patent is extended or adjusted under 35 U.S.C. 154(b) by 100 days.

(21) Appl. No.: 13/454,227

(22) Filed: Apr. 24, 2012

(65) Prior Publication Data

US 2012/0274966 A1    Nov. 1, 2012

(30) Foreign Application Priority Data

Apr. 27, 2011  (JP) ................... 2011-099683

(51) Int. Cl.
*G06F 3/12*  (2006.01)
(52) U.S. Cl.
USPC .......... 358/1.13; 345/173; 382/186; 382/187
(58) Field of Classification Search
USPC ................... 345/173; 358/1.13; 382/186, 187
See application file for complete search history.

(56) References Cited

U.S. PATENT DOCUMENTS

| | | | |
|---|---|---|---|
| 2004/0091281 | A1 | 5/2004 | Kimizuka |
| 2005/0025517 | A1 | 2/2005 | Ito |
| 2008/0240769 | A1 | 10/2008 | Kawasaki et al. |

FOREIGN PATENT DOCUMENTS

| | | |
|---|---|---|
| JP | 05301419 | 11/1993 |
| JP | 11-305896 | 11/1999 |
| JP | 2006-154904 | 6/2006 |
| JP | 2008-129683 | * 6/2008 |
| JP | 2009-163747 | 7/2009 |
| JP | 2009-265976 | 11/2009 |
| JP | 2010-39656 | 2/2010 |
| JP | 2010032780 | 2/2010 |

* cited by examiner

*Primary Examiner* — Eric A Rust
(74) *Attorney, Agent, or Firm* — Gerald E. Hespos; Michael J. Porco; Matthew T. Hespos (57) ABSTRACT

An input recognizer performs a processing of recognizing handwriting input or soft key input, and a processing of calculating a length of a trajectory which a depressing coordinate has moved by repeating acquisition of the depressing coordinate on an input screen in response to an interruption command requesting input recognition. An interruption commander selectively performs a handwriting input mode and a soft key input mode. An input mode switcher sets a mode of the interruption commander to the soft key input mode when a depressing start of a touch panel portion is detected, and switches the mode of the interruption commander from the soft key input mode to the handwriting input mode when the input recognizer recognizes that the length of the trajectory which the depressing coordinate has moved from detection of the depressing start reaches a predetermined value.

12 Claims, 7 Drawing Sheets

DETERMINING BETWEEN A HANDWRITING AND A SOFT KEY INPUT MODE FOR AN IMAGE FORMING APPARATUS

This application is based on Japanese Patent Application No. 2011-099683 filed on Apr. 27, 2011, the contents of which are hereby incorporated by reference.

BACKGROUND

The present disclosure relates to an information processing device provided with a touch panel function, and an information processing method.

As a touch panel input system, there are known a handwriting input system (a drag method) in which a user handwrites on an input screen for input, and a soft key input system (a click method) in which a user touches a soft key displayed on an input screen for input. In the case of handwriting input, a CPU acquires a depressing coordinate in a touch panel coordinate system at a predetermined time interval, and recognizes an inputted character or the like based on a trajectory along which the depressing coordinate has moved. In this system, if the time interval at which a depressing coordinate is acquired is unduly long, the number of acquired depressing coordinates may be insufficient, which may lead to misrecognition of the trajectory i.e. misrecognition of a character or the like. In view of this, in the case of handwriting input, it is required to shorten a time interval at which the CPU acquires a depressing coordinate. This may shorten a time when the CPU is operable to perform other processing during a depressing coordinate acquisition period, which may lead to a delay in performing other processing. In the specification, the depressing coordinate represents a position on a touch panel touched by the fingertip of a user, the tip of a touch panel pen, or the like.

On the other hand, in the case of soft key input using a soft key e.g. an icon, it is sufficient only to acquire a depressing coordinate by the CPU at a point of time when the user has started depressing a soft key, and it is not necessary to acquire a depressing coordinate thereafter. Therefore, it is possible to extend the time interval at which a depressing coordinate is acquired.

If the time interval at which a depressing coordinate is acquired by the CPU is short, the time when the CPU is operable to perform other processing during a depressing coordinate acquisition period is short. On the other hand, if the time interval at which a depressing coordinate is acquired by the CPU is long, it is possible to extend the time when the CPU is operable to perform other processing during a depressing coordinate acquisition period. Since the CPU is required to perform various processings other than depressing coordinate acquisition, it is preferable to extend the time interval at which a depressing coordinate is acquired as long as possible for efficient use of the CPU.

In view of the above, there has been proposed an arrangement, wherein the input mode is switchable by user's manipulation between a select input mode according to which the user is allowed to select an icon for input, and a pen input mode; the time interval at which the CPU acquires a depressing coordinate is extended in the select input mode; and the time interval at which the CPU acquires a depressing coordinate is shortened in the pen input mode. In the above arrangement, when the select input mode is selected, the time when the CPU is operable to perform other processing can be extended.

In the above arrangement, the user is required to manipulate the touch panel for selecting between the select input mode and the pen input mode, which is cumbersome to the user. Further, when the pen input mode is selected, the time interval at which a depressing coordinate is acquired is short. Consequently, the time when the CPU is operable to perform processings other than depressing coordinate acquisition during a pen input period is short.

In view of the above, an object of the present disclosure is to provide an information processing device and an information processing method that enable to extend a time interval at which a depressing coordinate is acquired both in the case of handwriting input and in the case of soft key input, without the need of user's switching the input mode between handwriting input and soft key input.

SUMMARY

An information processing device according to an aspect of the present disclosure includes a touch panel portion, a touch panel control portion, and an input recognizer. The touch panel portion displays an input screen. The touch panel control portion controls the touch panel portion to display the input screen including a region for handwriting input and a region for soft key input. The input recognizer performs a processing of recognizing the handwriting input or the soft key input, and a processing of calculating a length of a trajectory which a depressing coordinate has moved by repeating acquisition of the depressing coordinate on the input screen, in response to an interruption command requesting input recognition. The touch panel control portion includes a depressing detector, an interruption commander, and an input mode switcher. The depressing detector detects a depressing of the touch panel portion. The interruption commander selectively performs a handwriting input mode of outputting the interruption command to the input recognizer at a first time interval causing the input recognizer to be recognizable of the handwriting input, and a soft key input mode of outputting the interruption command to the input recognizer at a second time interval causing the input recognizer to be recognizable of the soft key input, the second time interval being longer than the first time interval. The input mode switcher sets a mode of the interruption commander to the soft key input mode when the depressing detector detects a depressing start of the touch panel portion, and switches the mode of the interruption commander from the soft key input mode to the handwriting input mode when the input recognizer recognizes that the length of the trajectory which the depressing coordinate has moved from detection of the depressing start reaches a predetermined value.

An information processing device according to another aspect of the present disclosure is an information processing device for processing information using a CPU. The information processing device includes a touch panel portion, a touch panel control portion, and an input recognizer. The touch panel portion displays an input screen, and outputs data that reflects a change in the input screen touched by a user. The touch panel control portion controls the touch panel portion to display the input screen including a region for handwriting input and a region for soft key input. The input recognizer is implemented by the CPU, and performs, in response to receiving an interruption command requesting input recognition by the CPU, a processing of recognizing the handwriting input or the soft key input by acquiring a depressing coordinate on the touch panel portion. The touch panel control portion includes: a depressing detector which detects a depressing of the touch panel portion. The interruption commander has a handwriting input mode of outputting the interruption command to the CPU at a first time interval causing the input recognizer to be recognizable of the handwriting input, and a soft key input mode of outputting the interruption command to the CPU at a second time interval causing the input recognizer to be recognizable of the soft key input, the second time interval being longer than the first time interval. The input mode switcher sets a mode of the interruption commander to the soft key input mode when the depressing detector detects a depressing start of the touch panel portion, and switches the mode of the interruption commander from the soft key input mode to the handwriting input mode when the input recognizer recognizes that a length of a trajectory which the depressing coordinate has moved from detection of the depressing start reaches a predetermined value.

An information processing method according to yet another aspect of the present disclosure is an information processing method for performing a handwriting input mode according to which an interruption command is outputted to a CPU at a first time interval recognizable of handwriting input, and a soft key input mode according to which the interruption command is outputted to the CPU at a second time interval recognizable of soft key input, the second time interval being longer than the first time interval. The information processing method includes first through fourth steps. In the first step, a touch panel portion is caused to display an input screen including a region for the handwriting input and a region for the soft key input. In the second step, there is performed a processing of performing the soft key input mode, when a depressing start of the touch panel portion is detected in a state that the input screen is displayed on the touch panel portion by the first step, and recognizing the soft key input by acquiring a depressing coordinate on the touch panel portion at the second time interval. In the third step, switching from the soft key input mode to the handwriting input mode is determined when a length of a trajectory which the depressing coordinate has moved from detection of the depressing start reaches a predetermined value in a state that the soft key input mode is set by the second step. In the fourth step, a processing of recognizing the handwriting input is performed by acquiring the depressing coordinate on the touch panel portion at the first time interval in a state that the handwriting input mode is set by the third step.

These and other objects, features and advantages of the present disclosure will become more apparent upon reading the following detailed description along with the accompanying drawings.

DETAILED DESCRIPTION

Figure 1:
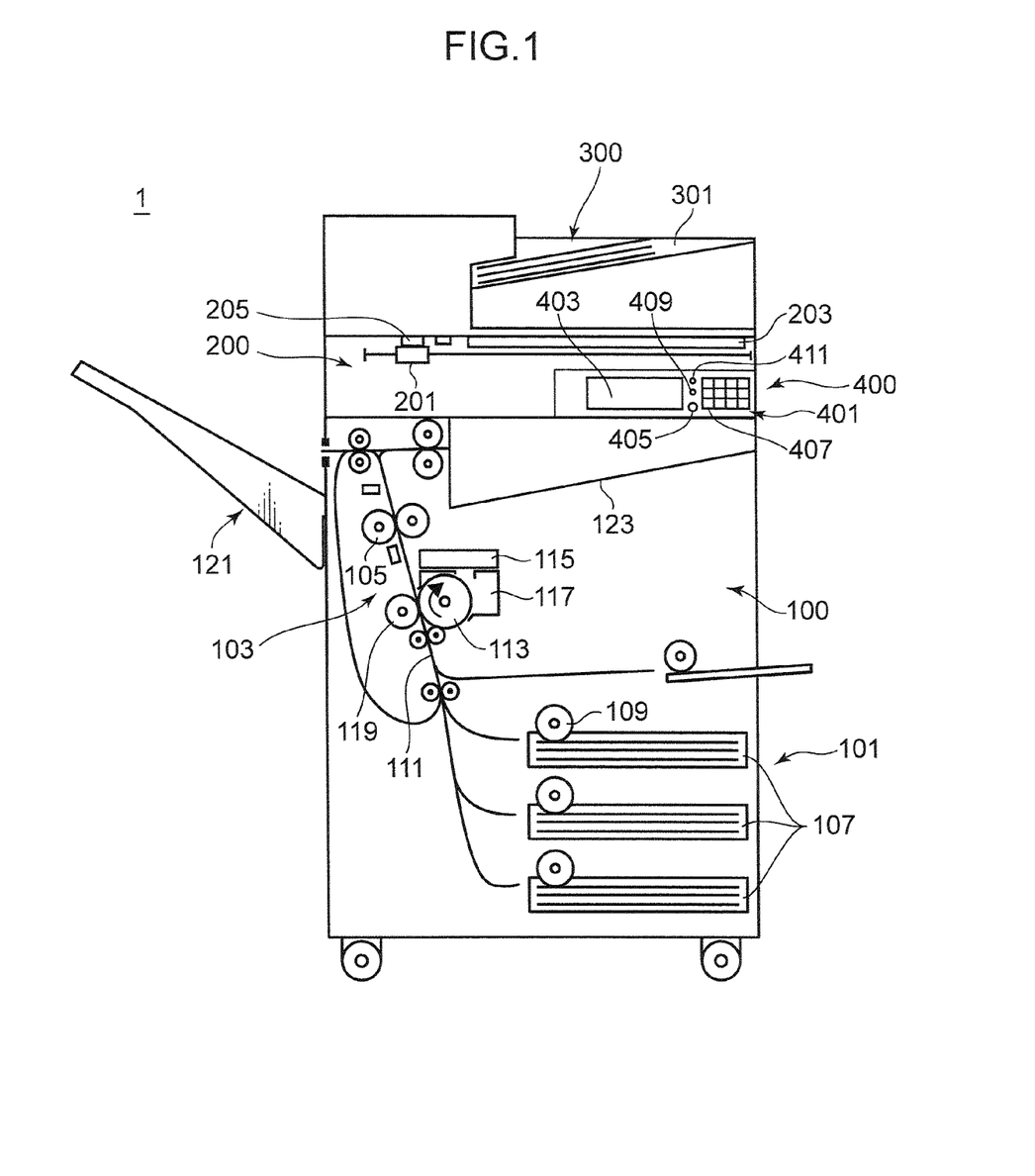
FIG. 1 is a diagram schematically showing an internal structure of an image forming apparatus embodying the present disclosure.

In the following, an embodiment of the present disclosure is described in detail referring to the drawings. FIG. 1 is a diagram schematically showing an internal structure of an image forming apparatus 1 embodying the present disclosure. The image forming apparatus 1 is an example of an image forming apparatus to which an information processing device of the present disclosure is applied. The image forming apparatus 1 may be a digital complex machine having the functions of a copier, a printer, a scanner and a facsimile machine. The image forming apparatus 1 is provided with an apparatus body 100, a document reading portion 200 disposed above the apparatus body 100, a document feeding portion 300 disposed above the document reading portion 200 and an operation portion 400 disposed on a front surface of an upper part of the apparatus body 100.

The document feeding portion 300 functions as an automatic document feeder, and is operable to feed sheets placed on a document placement portion 301 one after another to the document reading portion 200.

The document reading portion 200 is provided with a carriage 201 loaded with e.g. an exposure lamp, a document setter 203 constituted of a transparent member such as a glass member, an unillustrated CCD (Charge Coupled Device) sensor and a document reading slit 205. In the case where a document placed on the document setter 203 is read, the document is read by the CCD sensor while moving the carriage 201 in the longitudinal direction of the document setter 203. On the other hand, in the case where a document fed from the document feeding portion 300 is read, the carriage 201 is moved to a position opposing the document reading slit 205, and the document fed from the document feeding portion 300 is read by the CCD sensor through the document reading slit 205. The CCD sensor outputs the read document as image data.

The apparatus body 100 is provided with a sheet storing portion 101, an image forming portion 103 and a fixing portion 105. The sheet storing portion 101 is disposed at a lowermost part of the apparatus body 100, and is provided with a sheet tray 107 in which a stack of sheets are stored. An uppermost sheet of the sheet stack stored in the sheet tray 107 is fed toward a sheet transport path 111 by driving a pickup roller 109. The sheet is transported to the image forming portion 103 along the sheet transport path 111.

When a sheet is transported to the image forming portion 103, a toner image is formed onto the sheet. The image forming portion 103 is provided with a photosensitive drum 113, an exposure portion 115, a developing portion 117 and a transferring portion 119. The exposure portion 115 generates light modulated in accordance with image data such as image data outputted from the document reading portion 200, image data transmitted from a personal computer or image data received by a facsimile machine, and irradiates the modulated light onto a circumferential surface of the photosensitive drum 113 that has been uniformly charged. By performing this operation, an electrostatic latent image corresponding to the image data is formed on the circumferential surface of the photosensitive drum 113. Supplying toner from the developing portion 117 onto the circumferential surface of the photosensitive drum 113 in this state forms a toner image corresponding to the image data onto the circumferential surface of the photosensitive drum 113. The toner image is then transferred onto the sheet transported from the sheet storing portion 101 by the transferring portion 119.

The sheet carrying the transferred toner image is fed to the fixing portion 105. In the fixing portion 105, the toner image and the sheet undergo heating and pressurization, whereby the toner image is fixed onto the sheet. The sheet after the image fixation is discharged onto a stack tray 121 or a discharge tray 123.

The operation portion 400 is provided with a hard key portion 401 and a touch panel portion 403. The touch panel portion 403 is adapted to display a screen (an input screen) including soft keys. The user is allowed to manipulate the soft keys while viewing the screen to thereby perform settings or the like required for performing an intended function such as copying.

The hard key portion 401 is provided with operation keys comprised of hard keys. Specifically, the hard key portion 401 includes a start key 405, a ten key 407, a stop key 409 and a reset key 411.

The start key 405 is a key with which the user is allowed to start an operation such as copying or facsimile transmission. The ten key 407 is a key with which the user is allowed to input a number such as the number of copies or a facsimile number. The stop key 409 is a key with which the user is allowed to suspend an operation such as copying. The reset key 411 is a key with which the user is allowed to return the set contents to an initial set condition.

Figure 2:
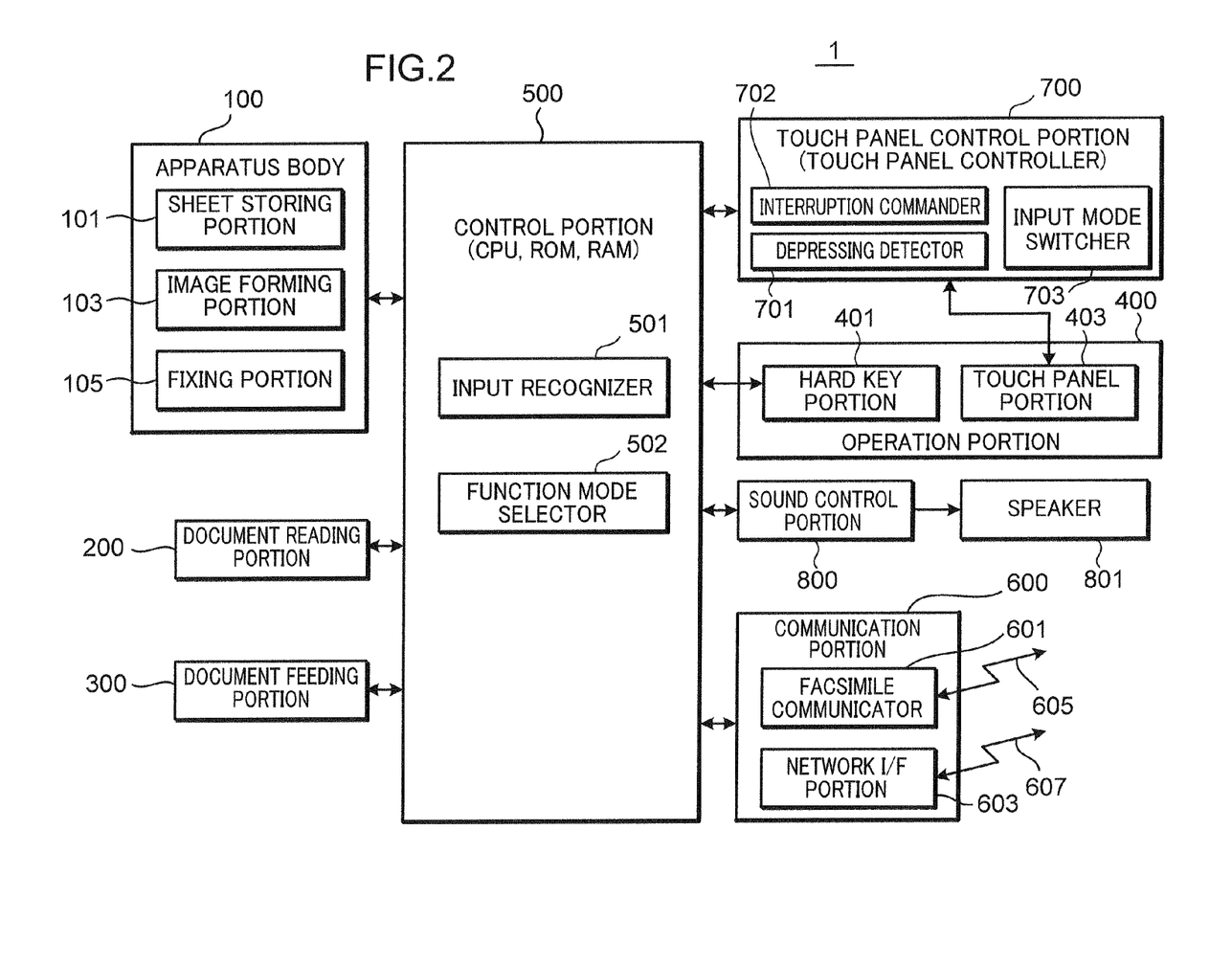
FIG. 2 is a block diagram showing an arrangement of the image forming apparatus of the embodiment.

FIG. 2 is a block diagram showing an arrangement of the image forming apparatus 1 shown in FIG. 1. The image forming apparatus 1 is configured in such a manner that the apparatus body 100, the document reading portion 200, the document feeding portion 300, the operation portion 400, a control portion 500, a communication portion 600, a touch panel control portion 700 and a sound control portion 800 are connected to each other by a bus. Since the apparatus body 100, the document reading portion 200, the document feeding portion 300 and the operation portion 400 have been described above, the description thereof is omitted herein.

The control portion 500 is provided with a CPU (Central Processing Unit), an ROM (Read Only Memory), an RAM (Random Access Memory) and an image memory. The CPU controls the respective elements in the image forming apparatus 1 such as the apparatus body 100 required for operating the image forming apparatus 1. The ROM stores a software necessary for controlling the operation of the image forming apparatus 1. The RAM temporarily stores data generated in the course of executing the software, and stores an application software. The image memory temporarily stores image data such as image data outputted from the document reading portion 200, image data transmitted from a personal computer, and image data received by facsimile transmission.

The control portion 500 has the functions of an input recognizer 501 and a function mode selector 502. The input recognizer 501 is implemented by e.g. the CPU, the ROM and the RAM in the control portion 500. In response to an interruption command requesting input recognition to the CPU, the input recognizer 501 performs a processing of recognizing handwriting input or soft key input on the touch panel portion 403 by acquiring a depressing coordinate on the touch panel portion 403. In other words, in response to an interruption command requesting input recognition, the input recognizer 501 performs a processing of recognizing handwriting input or soft key input by repeating depressing coordinate acquisition with respect to an input screen.

In the handwriting input mode, the function mode selector 502 selects a copy mode of performing a copy function in the case where the input recognizer 501 recognizes an input assigned to selecting copying, selects a facsimile mode of performing a facsimile function in the case where the input recognizer 501 recognizes an input assigned to selecting facsimile transmission, and selects a scanner mode of performing a scanner function in the case where the input recognizer 501 recognizes an input assigned to selecting scanning.

The touch panel control portion 700 is a controller which controls the touch panel portion 403. The touch panel control portion 700 causes the touch panel portion 403 to display an input screen including a region for handwriting input and a region for soft key input. The touch panel portion 403 displays an input screen, and outputs data that reflects a change in the input screen touched by the user. The touch panel control portion 700 is provided with a depressing detector 701, an interruption commander 702 and an input mode switcher 703.

The depressing detector 701 detects a depressing of the touch panel portion 403. When the user's fingertip or the tip of a touch panel pen (hereinafter, simply called as the fingertip of the user) touches a certain position on the touch panel portion 403, the depressing detector 701 detects the depressed position (a depressing coordinate). The depressing detector 701 is a part of the touch panel portion 403 that implements the aforementioned function. When the depressing detector 701 detects a depressing start of the touch panel portion 403, the input recognizer 501 performs a processing of computing the length of the trajectory which the depressing coordinate has moved by repeating depressing coordinate acquisition with respect to the input screen.

The interruption commander 702 selectively performs the handwriting input mode and the soft key input mode. In the handwriting input mode, the interruption commander 702 outputs an interruption command to the CPU (the input recognizer 501) in the control portion 500 at a first time interval causing the input recognizer 501 to be recognizable of handwriting input. In the soft key input mode, the interruption commander 702 outputs an interruption command to the CPU (the input recognizer 501) in the control portion 500 at a second time interval causing the input recognizer 501 to be recognizable of soft key input. The second time interval is longer than the first time interval.

In response to detecting by the depressing detector 701 that the user has started depressing the touch panel portion 403, the input mode switcher 703 sets the mode of the interruption commander 702 to the soft key input mode. Then, when the input recognizer 501 recognizes that the length of the trajectory which a depressing coordinate has moved from detection of the depressing start reaches a predetermined value, the input mode switcher 703 switches the mode of the interruption commander 702 from the soft key input mode to the handwriting input mode.

The depressing coordinate represents a position on the touch panel portion 403 touched by the fingertip of the user, and the moving trajectory of a depressing coordinate represents a trajectory obtained by tracing a change in the position of the depressing coordinate, as the fingertip of the user moves on the touch panel portion 403. Accordingly, in the case where the depressing coordinate changes from the point A (a1, a2) to the point B (b1, b2), and then from the point B to the point C (c1, c2), the length of the trajectory which a depressing coordinate has moved is obtained by summing the distance between the point A and the point B, and the distance between the point B and the point C.

The sound control portion 800 performs a processing of notifying the user of a selected function by outputting sound from a speaker 801, in the case where the user selects the copying function, the facsimile function, or the scanner function by handwriting on the touch panel portion 403.

The communication portion 600 is provided with a facsimile communicator 601 and a network I/F portion 603. The facsimile communicator 601 is provided with an NCU (Network Control Unit) for controlling phone line connection to a facsimile machine for communication, and a modulation/demodulation circuit for modulating/demodulating a signal for facsimile communication. The facsimile communicator 601 is connected to a phone line 605.

The network I/F portion 603 is connected to a LAN (Local Area Network) 607. The network I/F portion 603 is a communications interface circuit for use in communications with a terminal device such as a personal computer connected to the LAN 607.

Figure 3:
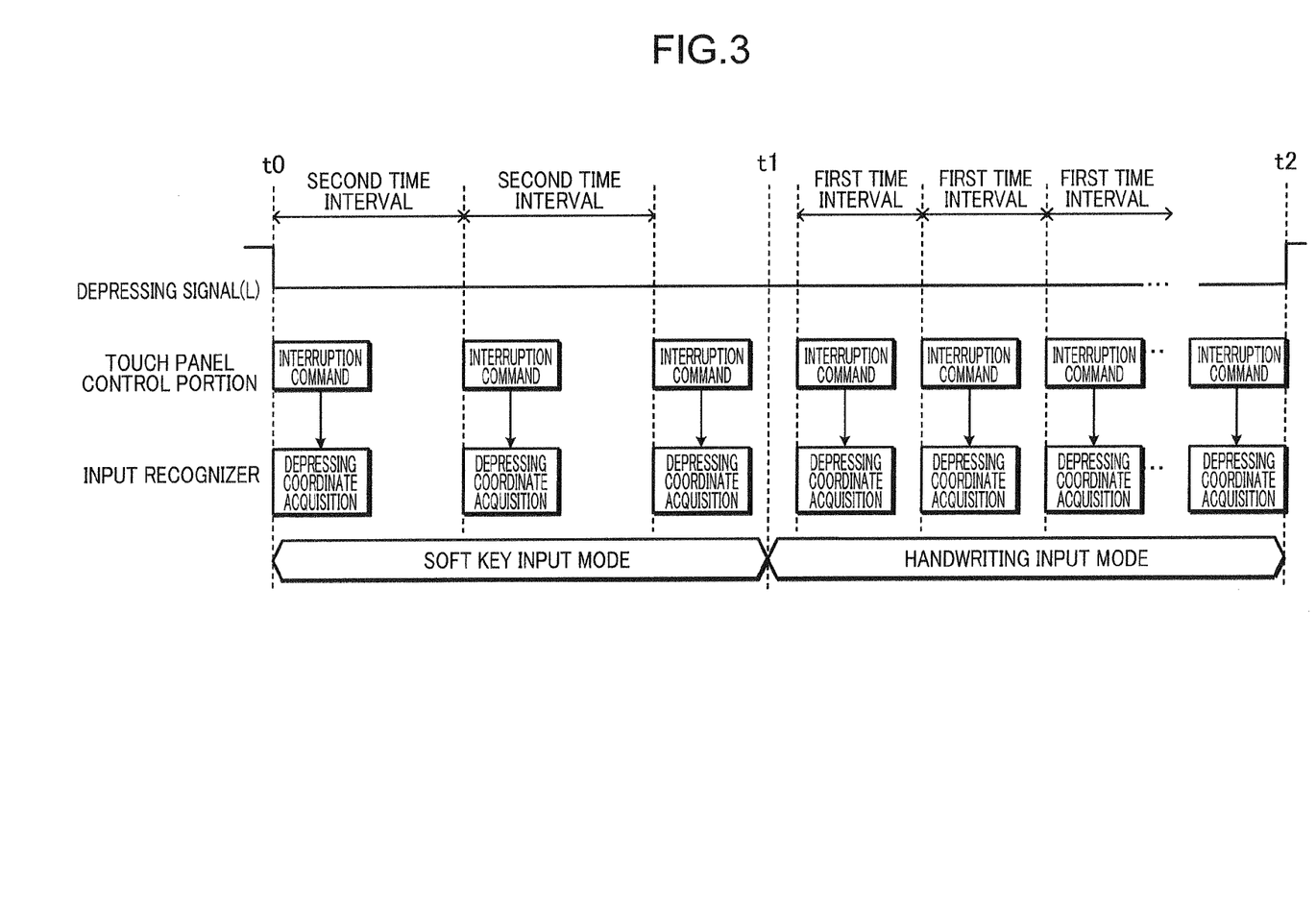
FIG. 3 is a timing chart showing relationships between interruption command requesting input recognition and depressing coordinate acquisition in a soft key input mode and in a handwriting input mode in the image forming apparatus of the embodiment.

FIG. 3 is a timing chart showing an example of relationships between interruption command requesting input recognition and depressing coordinate acquisition in the soft key input mode and in the handwriting input mode in the image forming apparatus 1 of the embodiment. When the fingertip touches the touch panel portion 403 shown in FIG. 2, the depressing detector 701 detects the depressing, and outputs a depressing signal e.g. a low signal L at a timing t0. During an output period of the depressing signal, in other words, during a period when the fingertip touches the touch panel portion 403, the interruption commander 702 outputs an interruption command requesting input recognition to the CPU in the control portion 500 at the first time interval or the second time interval.

Since the interruption commander 702 is default in the soft key input mode, the interruption commander 702 outputs an interruption command requesting input recognition to the CPU in the control portion 500 at the second time interval. In response to the interruption command, the CPU in the control portion 500 suspends other processing, and acquires, as the input recognizer 501, a depressing coordinate on the touch panel portion 403, which is transmitted from the touch panel control portion 700.

At a timing t1 when the input recognizer 501 recognizes that the length of the trajectory which the depressing coordinate has moved from detection of the depressing start by the depressing detector 701 (timing t0), the input mode switcher 703 switches the mode of the interruption commander 702 from the soft key input mode to the handwriting input mode. Then, the interruption commander 702 outputs an interruption command requesting input recognition to the CPU in the control portion 500 at the first time interval. In response to the interruption command, the CPU in the control portion 500 as the input recognizer 501 acquires the depressing coordinate on the touch panel portion 403, which is transmitted from the touch panel control portion 700.

At a timing t2 when the fingertip is released from the touch panel portion 403, the depressing detector 701 stops outputting a depressing signal. As a result, the interruption commander 702 stops outputting an interruption command to the CPU in the control portion 500. Then, the input recognizer 501 recognizes handwriting input, based on the depressing coordinates acquired during a period from the timing t0 to the timing t2.

Figure 4:
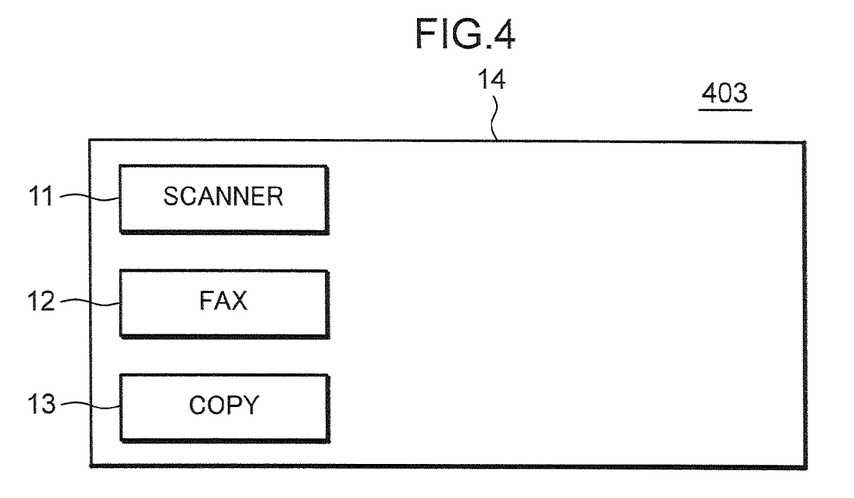
FIG. 4 is a diagram showing an example of an initial input screen displayed on a touch panel portion of the image forming apparatus of the embodiment.

FIG. 4 is a diagram showing an example of an initial input screen displayed on the touch panel portion 403. The input screen includes soft keys 11, 12, 13 displayed on the touch panel portion 403. A region where the soft keys 11, 12, 13 are displayed is a region for soft key input. The soft key 11 is a key with which the user is allowed to select the scanner function of the image forming apparatus 1. The softy key 12 is a key with which the user is allowed to select the facsimile function of the image forming apparatus 1. The soft key 13 is a key with which the user is allowed to select the copy function of the image forming apparatus 1. Alternatively, the soft keys may be e.g. icons, in place of the aforementioned keys.

The entirety of the input screen of the touch panel portion 403 serves as a region 14 for handwriting input. The touch panel control portion 700 shown in FIG. 2 controls the touch panel portion 403 to display an input screen having the region for soft key input i.e. the region where the soft keys 11, 12, 13 are displayed, included in the region 14 for handwriting input.

In the image forming apparatus 1 of the embodiment, in selecting the scanner function, the facsimile function, or the copy function, the user is allowed to select an intended function by manipulating the soft key 11, 12, 13, or by handwriting input.

Figure 5:
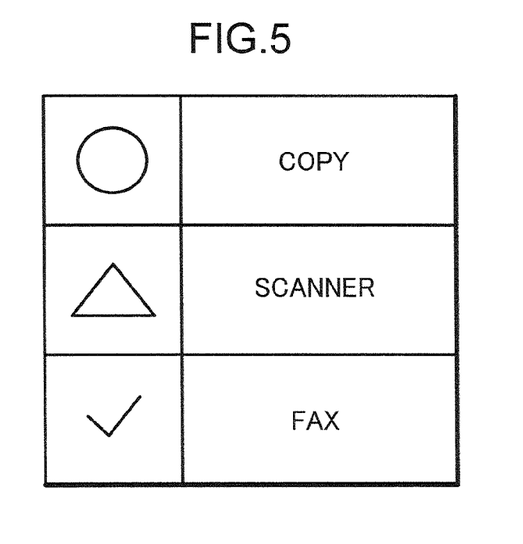
FIG. 5 is a diagram showing an example of handwriting input, and functions to be selected by the handwriting input.

FIG. 5 shows an example of handwriting input, and the functions to be selected by the handwriting input. When the user draws a circle on the touch panel portion 403, the copy function is selected. When the user draws a triangle on the touch panel portion 403, the scanner function is selected. When the user draws a check mark on the touch panel portion 403, the facsimile function is selected.

Figure 6:
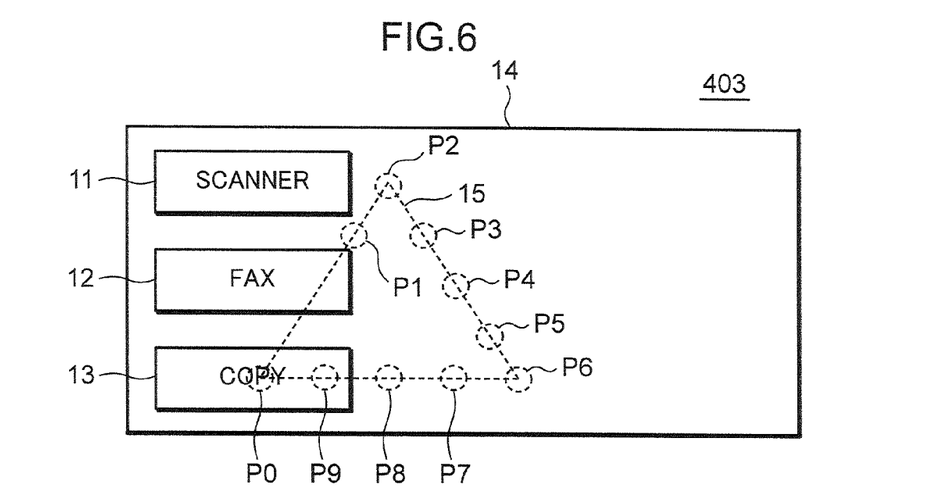
FIG. 6 is a diagram showing an example of the touch panel portion where a triangle is drawn for allowing a user to select a scanner function by handwriting input.
Figure 7:
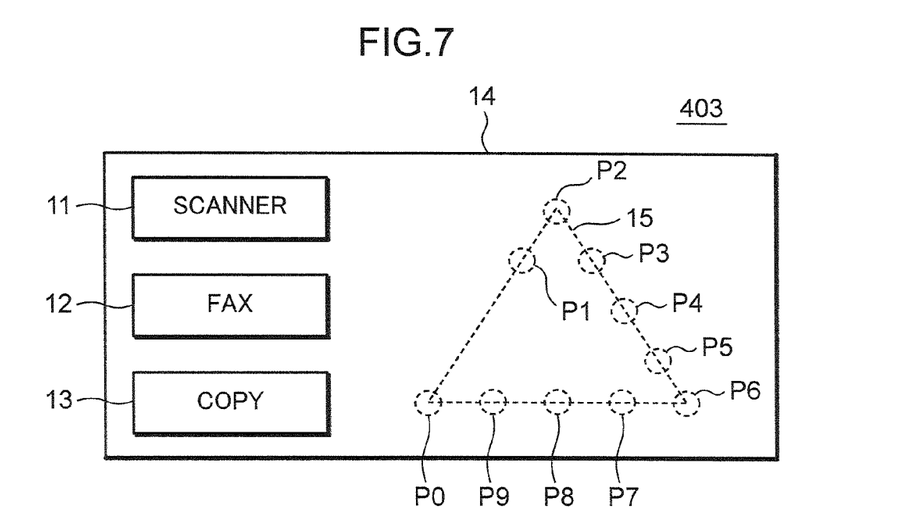
FIG. 7 is a diagram showing another example of the touch panel portion where a triangle is drawn for allowing the user to select the scanner function by handwriting input.

FIG. 6 is a diagram showing an example of the touch panel portion 403 where a triangle is drawn so that the user is allowed to select the scanner function by handwriting. FIG. 7 is a diagram showing another example of the touch panel portion 403 where a triangle is drawn so that the user is allowed to select the scanner function by handwriting. In FIG. 6, a depressing coordinate P0 at a point of time when the depressing start is in a region where a soft key is displayed, specifically, is in the region where the soft key 13 is displayed. On the other hand, in FIG. 7, a depressing coordinate P0 at a point of time when the depressing start is not in a region where a soft key is displayed. As will be described later referring to FIG. 8, in this embodiment, the image forming apparatus 1 is so configured that handwriting input is accurately recognized both in the case shown in FIG. 6 and in the case shown in FIG. 7.

The input recognizer 501 (see FIG. 2) acquires depressing coordinates P1, P2, P3, . . . , P8, P9 in this order, following the depressing coordinate P0 acquired at a point of time when the depressing starts. A trajectory 15 which is moving trajectory of the depressing coordinate is a triangle indicated by a dotted line.

The depressing coordinates P0, P1 are depressing coordinates acquired in the soft key input mode. The depressing coordinates P2 through P9 following the depressing coordinates P0, P1 are depressing coordinates acquired in the handwriting input mode. In the soft key input mode, the time interval at which a depressing coordinate is acquired is the second time interval, which is a relatively long time interval. In the handwriting input mode, the time interval at which a depressing coordinate is acquired is the first time interval, which is a relatively short time interval. Accordingly, in the case where a figure is drawn by moving the fingertip at a constant velocity, the distance between the depressing coordinate P0 and the depressing coordinate P1 is long relative to the distances between the other depressing coordinates adjacent to each other, out of the adjacent depressing coordinates.

Figure 8:
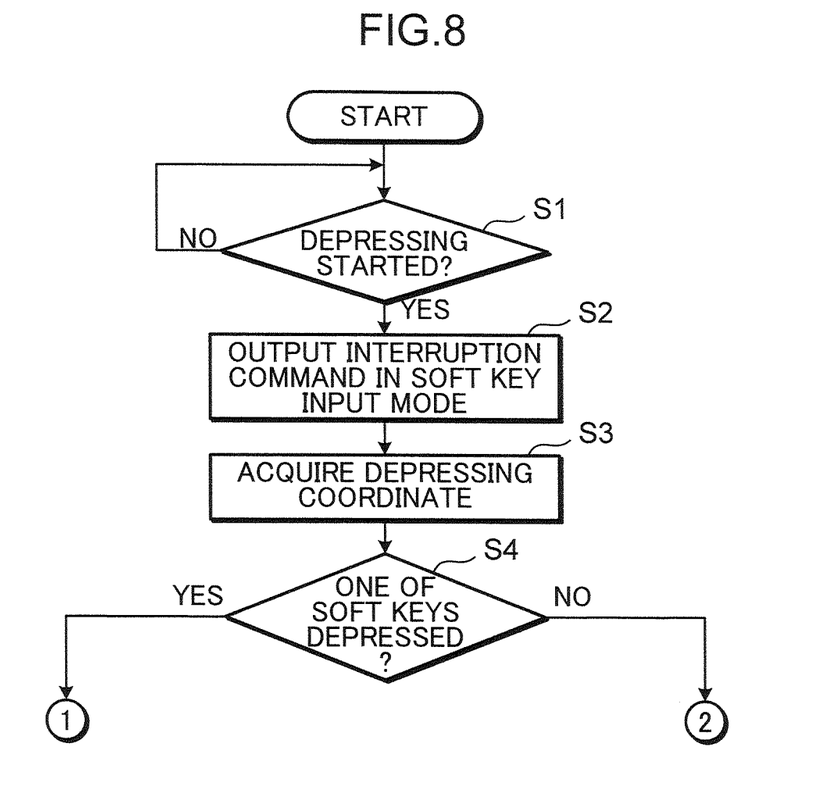
FIG. 8 is a first half of a flowchart for describing processings of the soft key input mode and the handwriting input mode in the image forming apparatus of the embodiment.
Figure 9:
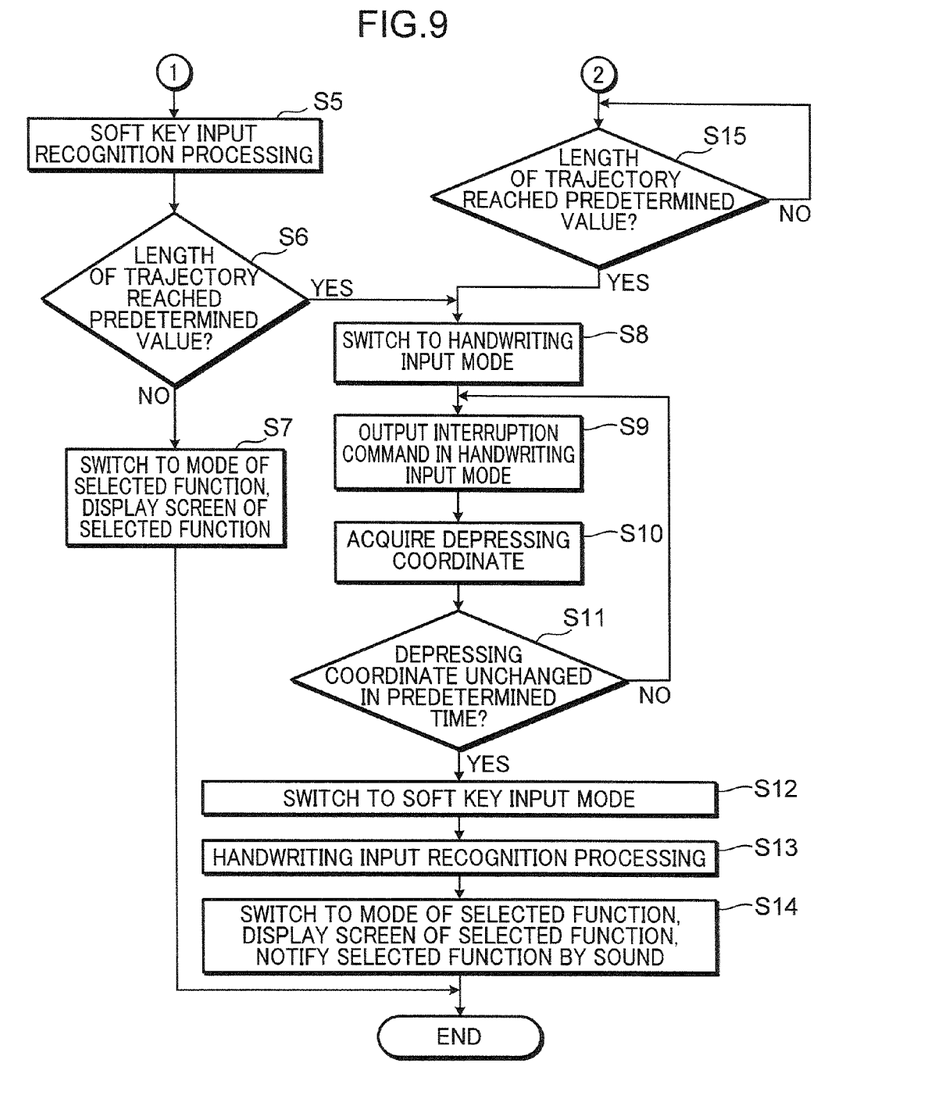
FIG. 9 is a second half of the flowchart for describing the processings of the soft key input mode and the handwriting input mode in the image forming apparatus of the embodiment.

Next, the processings of the soft key input mode and the handwriting input mode in the image forming apparatus 1 of the embodiment are described mainly referring to FIG. 2, FIG. 3, FIG. 8 and FIG. 9. FIG. 8 and FIG. 9 are a flowchart for describing the processing. The touch panel control portion 700 determines whether the depressing starts on the touch panel portion 403 (Step S1). When the fingertip touches the touch panel portion 403, the depressing detector 701 outputs a depressing signal. In response to output of the depressing signal, the touch panel control portion 700 determines that the depressing starts on the touch panel portion 403.

In the case where the touch panel control portion 700 does not determine that the depressing starts on the touch panel portion 403 (NO in Step S1), the touch panel control portion 700 repeats the processing in Step S1. In the case where the touch panel control portion 700 determines that the depressing starts on the touch panel portion 403 (YES in Step S1), the interruption commander 702 outputs an interruption command requesting input recognition to the CPU in the control portion 500 in the soft key input mode (Step S2).

In response to the interruption command, the input recognizer 501 performs a processing of acquiring a depressing coordinate on the touch panel portion 403 (Step S3). The input recognizer 501 determines whether one of the soft keys 11, 12, 13 (see FIG. 4) is depressed in Step S1 (Step S4). Specifically, the input recognizer 501 determines which one of the coordinates has been acquired out of the coordinates disposed in a display area of the soft key 11, the coordinates disposed in a display area of the soft key 12, and the coordinates disposed in a display area of the soft key 13.

In the case where the input recognizer 501 recognizes that one of the soft keys 11, 12, 13 is depressed in Step S1 (YES in Step S4), the input recognizer 501 performs a soft key input recognition processing to recognize selection of the designated function (Step S5). For instance, when the soft key 13 shown in FIG. 4 is touched, the input recognizer 501 recognizes selection of the copy function by acquiring a coordinate disposed in the display area of the soft key 13.

The input recognizer 501 determines whether the length of the trajectory which the depressing coordinate has moved reaches a predetermined value e.g. 2 cm (Step S6). The predetermined value may be a predetermined set value. In the case where the input recognizer 501 does not determine that the length of the trajectory which the depressing coordinate has moved reaches the predetermined value (NO in Step S6), in other words, in the case where the fingertip is released from the touch panel portion 403 before the length of the trajectory which the depressing coordinate has moved reaches the predetermined value, the function mode selector 502 switches the mode of the image forming apparatus 1 that has been recognized in Step S5 to the mode of the recognized function, and causes the touch panel portion 403 to display an input screen of the recognized mode (Step S7). For instance, when the input recognizer 501 recognizes that the soft key 13 is depressed, the function mode selector 502 sets the mode of the image forming apparatus 1 to the copy mode, and causes the touch panel portion 403 to display an input screen of the copy mode. Then, the control portion 500 waits until the user manipulates the operation portion 400 in the state of Step S7.

In the case where the length of the trajectory does not reach the predetermined value, and the fingertip continues touching the touch panel portion 403, in other words, in the case where the depressing detector 701 detects that the touch panel portion 403 is depressed, the touch panel control portion 700 causes the touch panel portion 403 not to display an input screen assigned to the soft key recognized by the input recognizer 501.

On the other hand, for instance, as shown in FIG. 6, in the case where the depressing coordinate acquired by the input recognizer 501 is changed from P0 to P1, and accordingly, the input recognizer 501 determines that the length of the trajectory which the depressing coordinate has moved reaches the predetermined value (YES in Step S6), the input mode switcher 703 switches the mode of the interruption commander 702 from the soft key input mode to the handwriting input mode (Step S8).

The interruption commander 702 outputs an interruption command requesting input recognition to the CPU in the control portion 500 in the handwriting input mode (Step S9). In response to the interruption command, the input recognizer 501 performs a processing of acquiring a depressing coordinate on the touch panel portion 403 (Step S10).

The input recognizer 501 determines whether the position of the depressing coordinate does not change in a predetermined time e.g. 0.5 second (Step S11). In the case where the input recognizer 501 does not determine that the position of the depressing coordinate does not change in the predetermined time (NO in Step S11), in other words, in the case where the input recognizer 501 determines that the position of the depressing coordinate changes in the predetermined time, the routine returns to Step S9.

In the case where the input recognizer 501 determines that the position of the depressing coordinate does not change in the predetermined time (YES in Step S11), the input mode switcher 703 switches the mode of the interruption commander 702 from the handwriting input mode to the soft key input mode, based on the recognition that handwriting input has ended regardless of detection by the depressing detector 701 that a depressing signal is outputted (in other words, the fingertip of the user touches the touch panel portion 403 (Step S12).

Then, the input recognizer 501 performs a processing of recognizing handwriting input (Step S13). More specifically, the input recognizer 501 recognizes an input, based on an acquired depressing coordinate. For instance, as shown in FIG. 6, in the case where a triangle is drawn on the touch panel portion 403, and the input recognizer 501 acquires the depressing coordinates P0 through P9, the input recognizer 501 recognizes selection of the scanner function.

When handwriting input is recognized by the input recognizer 501, the function mode selector 502 switches the mode of the image forming apparatus 1 to the mode of the recognized function, the touch panel control portion 700 causes the touch panel portion 403 to display an input screen of the recognized function, and the sound control portion 800 causes the speaker 801 to output a sound notifying the user of the recognized function (Step S14). For instance, if the input recognizer 501 recognizes the figure of a triangle, the function mode selector 502 switches the mode of the image forming apparatus 1 to the scanner mode, the touch panel control portion 700 causes the touch panel portion 403 to display an input screen of the scanner mode, and the sound control portion 800 causes the speaker 801 to output a sound notifying the user that the scanner function is selected. Then, the control portion 800 waits until the user manipulates the operation portion 400.

In the case where the input recognizer 501 does not determine that one of the soft keys 11, 12, 13 is depressed in Step S1 (NO in Step S4), the input recognizer 501 determines whether the length of the trajectory which the depressing coordinate has moved reaches the predetermined value (Step S15). In the case where the input recognizer 501 does not determine that the length of the trajectory which the depressing coordinate has moved reaches the predetermined value (NO in Step S15), the processing of Step S15 is repeated.

On the other hand, for instance, as shown in FIG. 7, in the case where the depressing coordinate acquired by the input recognizer 501 is changed from P0 to P1, and accordingly, the input recognizer 501 determines that the length of the trajectory which the depressing coordinate has moved reaches the predetermined value (YES in Step S15), the routine proceeds to Step S8.

The main effects of the embodiment will be described in the following. In the embodiment, after the depressing start is detected, and before it is recognized that the length of the trajectory 15 which the depressing coordinate has moved reaches the predetermined value e.g. 2 cm (NO in Step S6, NO in Step S15), in both of the case of handwriting input and the case of soft key input, the soft key input mode is set (Step S2). In the case of the soft key input mode, the time interval at which the CPU (the input recognizer 501) in the control portion 500 acquires a depressing coordinate is set to the second time interval. Since the second time interval is a time interval capable of recognizing soft key input, the second time interval can be extended relative to the first time interval. Thus, it is possible to extend the time when the CPU in the control portion 500 is operable to perform other processing (for instance, in the case of copying, an image forming processing) during a period before it is recognized that the length of the trajectory 15 which the depressing coordinate has moved reaches the predetermined value. Then, in response to recognizing that the length of the trajectory 15 which the depressing coordinate has moved reaches the predetermined value (YES in Step S6, YES in Step S15), the input mode switcher 703 automatically switches the mode of the interruption commander from the soft key input mode to the handwriting input mode. In the case of the handwriting input mode, the time interval at which the CPU (the input recognizer 501) in the control portion 500 acquires a depressing coordinate is set to the first time interval. Since the first time interval is a time interval capable of recognizing handwriting input, the first time interval at which a depressing coordinate is acquired can be shortened to thereby accurately recognize handwriting input.

As described above, in the embodiment, both in the case of handwriting input and in the case of soft key input, it is possible to set a long time interval (the second time interval) at which a depressing coordinate is acquired, and the user does not have to switch the input mode both in the case of handwriting input and in the case of soft key input. Further, the time interval at which a depressing coordinate is acquired can also be extended even in the case of handwriting input, the CPU in the control portion 500 is operable to perform other processing without a delay, despite that an input recognition processing is performed, even if the CPU in the control portion 500 has a poor performance, in other words, even in use of an inexpensive CPU.

In the embodiment, in the case of handwriting input, a relatively long time interval i.e. the second time interval is set as the time interval at which a depressing coordinate is acquired during a period after it is detected that the user has started depressing the touch panel portion 403 until it is recognized that the length of the trajectory which the depressing coordinate has moved reaches the predetermined value. Accordingly, a sufficient number of depressing coordinates may not be acquired for an initial part of handwritten input. In view of this, an object for handwriting input includes relatively simple characters, figures and/or symbols recognizable of handwriting input, even if an initial part of handwritten input may not be recognized. The aforementioned value may be determined depending on the characters, the figures and/or the symbols, as an object for handwriting input.

Further, in the embodiment, as shown in FIG. 6, in response to user's depressing the region for soft key input i.e. one of the display areas of the soft keys 11, 12, 13 for the first time, the input recognizer 501 recognizes soft key input (Step S5). Thereafter, in the case where the input recognizer 501 recognizes that the length of the trajectory 15 which the depressing coordinate has moved from detection of the depressing start reaches the predetermined value (YES in Step S6), the input mode switcher 703 switches the mode of the interruption commander 702 from the soft key input mode to the handwriting input mode (Step S8). In this way, in the embodiment, in the case of handwriting input, once it is recognized that the length of the trajectory 15 which the depressing coordinate has moved reaches the predetermined value, regardless of recognizing soft key input because the region for soft key input has been depressed for the first time, the input mode is switched to the handwriting input mode. With this arrangement, it is possible to perform handwriting input, even if the region for soft key input is depressed for the first time in the case of handwriting input. Thus, in the embodiment, it is possible to cause the touch panel portion 403 to display an input screen having the region for soft key input included in the region 14 for handwriting input. Accordingly, it is possible to expand the region 14 for handwriting input. Visually impaired people may have difficulty in discriminating between the region 14 for handwriting and the region for soft key input, in the input screen of the touch panel portion 403. Accordingly, the above arrangement is especially advantageous to the visually impaired people.

Further, in the embodiment, as shown in FIG. 5, in the handwriting input mode, an object to be recognized by the input recognizer 501 is a figure formed by drawing a traversable line. In the case of handwriting input, before the length of the trajectory 15 which the depressing coordinate has moved reaches the predetermined value after it is detected that the user has started depressing the touch panel portion 403, the input mode is set to the soft key input mode (Step S2). Accordingly, the depressing coordinate is acquired at the second time interval. As a result, a sufficient number of depressing coordinates may not be obtained for an initial part of handwritten input. In this embodiment, the object to be recognized by handwriting input is a figure formed by drawing a traversable line. It is easy to recognize a figure formed by drawing a traversable line in comparison with an object that is not formed by drawing a traversable line, even if a sufficient number of depressing coordinates is not acquired for an initial part of handwritten input. Further, in the case where an object is not formed by drawing a traversable line, if the first stroke of handwriting is short, the first stroke may not be recognized as a stroke by handwriting input. In the case of a character having several strokes, if the first stroke is short, the processing of recognizing the object as one character may become cumbersome.

In the embodiment, as shown in FIG. 5, in the case where the copy function, the scanner function or the facsimile function is selected by handwriting input, the user is allowed to select a figure or a symbol formed by drawing a traversable line. Since it is relatively easy for visually impaired people to draw such a figure or symbol on the touch panel portion 403, the above arrangement allows the visually impaired people to select an intended function without an erroneous operation.

In this embodiment, in the case where it is determined that the depressing coordinate does not change in the predetermined time in handwriting input (YES in Step S11), the input mode is switched from the handwriting input mode to the soft key input mode (Step S12). Thus, it is determined that handwriting input has ended unless the fingertip moves within the predetermined time, regardless of fingertip's touching the touch panel portion 403, and the input mode is set to the soft key input mode. With this arrangement, the CPU in the control portion 500 is operable to extend a time assigned to other processing (e.g. a processing in Step S14 of notifying the user by outputting a sound). Thus, it is possible to prevent a delay in performing other processing, resulting from an input recognition processing.

Further, the embodiment has the following effects. In the case where the length of the trajectory 15 does not reach the predetermined value, and depressing of the touch panel portion 403 is detected, it impossible to determine whether the input is the soft key input or the handwriting input (Step S6). When a screen assigned to soft key input is displayed on the touch panel portion 403 in this state, after that, if the input mode is switched to the handwriting input mode, the control of displaying the screen becomes useless. In this embodiment, in the case where the length of the trajectory 15 does not reach the predetermined value, and the depressing of the touch panel portion 403 is detected, the screen assigned to soft key input is not displayed on the touch panel portion 403. Then, in the case where the length of the trajectory 15 does not reach the predetermined value, and depressing of the touch panel portion 403 is not detected any longer, the screen assigned to soft key input is displayed on the touch panel portion 403 (Step S7). As described above, in the embodiment, a screen assigned to soft key input is displayed on the touch panel portion 403 at a point of time when it is enabled to specify the soft key input mode. Thus, there is no likelihood that the control of displaying a screen assigned to soft key input may become useless.

In the following, some modifications of the embodiment are described. As described above referring to FIG. 4, the touch panel control portion 700 causes the touch panel portion 40 to display an input screen having soft key input i.e. the region where the soft keys 11, 12, 13 are displayed, included in the region 14 for handwriting input. In the first modification, the touch panel control portion 700 causes the touch panel portion 403 to display an input screen where the region 14 for handwriting input and the region for soft key input are discriminated from each other. In the first modification, as well as in the embodiment, in the case of handwriting input, it is possible to implement the soft key input mode during a period from a point of time when the depressing detector 701 detects the depressing start to a point of time when the length of the trajectory 15 which the depressing coordinate has moved reaches the predetermined value. Accordingly, both in the case of handwriting input and in the case of soft key input, it is possible to set the second time interval, which is a longer time interval at which a depressing coordinate is acquired, out of the first and second time intervals, and to eliminate the need of user's switching the input mode between the handwriting input mode and the soft key input mode. Further, in response to user's fingertip touching the region for soft key input, it is possible to quickly recognize user's depressing a soft key. Thus, the above arrangement enables to eliminate the need of the processing in Step S6, and simplify the input recognition processing.

In the second modification, the image forming apparatus is configured to switch between a first input recognition and a second input recognition in response to user's manipulating the operation portion 400. The first input recognition is an input recognition shown in FIG. 8. The second input recognition is such that in the case where the touch panel control portion 700 causes the touch panel portion 403 to display a screen assigned to soft key input in response to user's manipulating the operation portion 400, the soft key input mode is performed. On the other hand, the handwriting input mode is performed in the case where the touch panel control portion 700 causes the touch panel portion 403 to display a screen assigned to handwriting input in response to use's manipulating the operation portion 400.

In the second modification, in response to user's selecting the second input recognition, the user is allowed to select between the soft key input mode and the handwriting input mode.

In the embodiment, the image forming apparatus 1 has been described by an example of the information processing device of the present disclosure. The information processing device of the present disclosure is not limited to the image forming apparatus 1, but may include an automatic teller machine (ATM), an automatic ticket vending machine, a mobile phone, a personal digital assistant (PDA), a car navigation system, and a portable video game machine, each of which is provided with a touch panel.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An information processing device, comprising:
   a touch panel portion which displays an input screen;
   a touch panel control portion which controls the touch panel portion to display the input screen including a region for handwriting input and a region for soft key input; and
   an input recognizer which performs a processing of recognizing the handwriting input or the soft key input, and a processing of calculating a length of a trajectory which a depressing coordinate has moved by repeating acquisition of the depressing coordinate on the input screen, in response to an interruption command requesting input recognition, wherein
   the touch panel control portion includes:
      a depressing detector which detects a depressing of the touch panel portion;
      an interruption commander which selectively performs a handwriting input mode of outputting the interruption command to the input recognizer at a first time interval causing the recognizer to be recognizable of the handwriting input, and a soft key input mode of outputting the interruption command to the input recognizer at a second time interval causing the recognizer to be recognizable of the soft key input, the second time interval being longer than the first time interval; and
      an input mode switcher which sets a mode of the interruption commander to the soft key input mode when the depressing detector detects a depressing start of the touch panel portion, and switches the mode of the interruption commander from the soft key input mode to the handwriting input mode when the input recognizer recognizes that the length of the trajectory which the depressing coordinate has moved from detection of the depressing start reaches a predetermined value.

2. The information processing device according to claim 1, wherein the touch panel control portion controls the touch panel portion to display the input screen having the region for the soft key input included in the region for the handwriting input, and the input mode switcher switches the mode of the interruption commander from the soft key input mode to the handwriting input mode, in the case where the input recognizer recognizes that the length of the trajectory which the depressing coordinate has moved from the detection of the depressing start reaches the predetermined value, after the input recognizer recognizes the soft key input in response to depressing the region for the soft key input.

3. The information processing device according to claim 2, wherein the touch panel control portion controls the touch panel portion not to display a screen assigned to the soft key input recognized by the input recognizer, in the case where the length of the trajectory does not reach the predetermined value and the depressing detector detects the depressing on the touch panel portion, and the touch panel control portion controls the touch panel portion to display the screen assigned to the soft key input recognized by the input recognizer, in the case where the length of the trajectory does not reach the predetermined value and the depressing detector does not detect the depressing on the touch panel portion any longer.

4. The information processing device according to claim 1, wherein the touch panel control portion controls the touch panel portion to display the input screen where the region for the handwriting input and the region for the soft key input are discriminated from each other, and the input mode switcher switches the mode of the interruption commander from the soft key input mode to the handwriting input mode, in the case where the input recognizer recognizes that the length of the trajectory which the depressing coordinate has moved from the detection of the depressing start reaches the predetermined value, after the input recognizer recognizes the handwriting input in response to depressing the region for the handwriting input.

5. The information processing device according to claim 4, wherein the touch panel control portion controls the touch panel portion to display a screen assigned to the soft key input recognized by the input recognizer, without performing a processing of recognizing by the input recognizer as to whether the length of the trajectory reaches the predetermined value, in the case where the region for the soft key input is depressed.

6. The information processing device according to claim 1, further comprising:

an operation portion; and a control portion which receives an operation of selecting between a first input recognition indicating that the input mode switcher performs a function, and a second input recognition indicating that the input mode switcher does not perform the function, wherein the control portion receives an operation of selecting between the soft key input mode and the handwriting input mode in response to manipulating the operation portion in the second input recognition.

7. The information processing device according to claim 1, wherein an object to be recognized by the input recognizer is an object formed by drawing a traversable line in the handwriting input mode.

8. The information processing device according to claim 1, wherein the input mode switcher switches the mode of the interruption commander from the handwriting input mode to the soft key input mode, in the case where the input recognizer determines that the depressing coordinate does not change in a predetermined time in the handwriting input mode.

9. The information processing device according to claim 1, wherein the information processing device is an image forming apparatus having a copy function, a facsimile function and a scanner function, and the information processing device further comprises a function mode selector which selects a copy mode according to which the copy function is performed, in the case where the input recognizer recognizes an input assigned to selecting the copy mode in the handwriting input mode, selects a facsimile mode according to which the facsimile function is performed, in the case where the input recognizer recognizes an input assigned to selecting the facsimile mode in the handwriting input mode, and selects a scanner mode according to which the scanner function is performed, in the case where the input recognizer recognizes an input assigned to selecting the scanner mode in the handwriting input mode.

10. An information processing method for performing a handwriting input mode according to which an interruption command is outputted to a CPU at a first time interval recognizable of handwriting input, and a soft key input mode according to which the interruption command is outputted to the CPU at a second time interval recognizable of soft key input, the second time interval being longer than the first time interval, the information processing method comprising:

a first step of causing a touch panel portion to display an input screen including a region for the handwriting input and a region for the soft key input;

a second step of performing a processing of performing the soft key input mode, when a depressing start of the touch panel portion is detected in a state that the input screen is displayed on the touch panel portion by the first step, and recognizing the soft key input by acquiring a depressing coordinate on the touch panel portion at the second time interval;

a third step of determining switching from the soft key input mode to the handwriting input mode when a length of a trajectory which the depressing coordinate has moved form detection of the depressing start reaches a predetermined value in a state that the soft key input mode is set by the second step; and a fourth step of performing a processing of recognizing the handwriting input by acquiring the depressing coordinate on the touch panel portion at the first time interval in a state that the handwriting input mode is performed by the third step.

11. The information processing method according to claim 10, further comprising:

a step of switching from the handwriting input mode to the soft key input mode, in the case where it is determined that the depressing coordinate does not change in a predetermined time in a state that the handwriting input mode is set by the third step.

12. An information processing device for processing information using a CPU, comprising:

a touch panel portion which displays an input screen, and outputs data that reflects a change in the input screen touched by a user;

a touch panel control portion which controls the touch panel portion to display the input screen including a region for handwriting input and a region for soft key input; and an input recognizer which is implemented by the CPU, and performs, in response to receiving an interruption command requesting input recognition by the CPU, a processing of recognizing the handwriting input or the soft key input by acquiring a depressing coordinate on the touch panel portion, wherein the touch panel control portion includes:

a depressing detector which detects a depressing of the touch panel portion;

an interruption commander which has a handwriting input mode of outputting the interruption command to the CPU at a first time interval causing the input recognizer to be recognizable of the handwriting input, and a soft key input mode of outputting the interruption command to the CPU at a second time interval causing the input recognizer to be recognizable of the soft key input, the second time interval being longer than the first time interval; and an input mode switcher which sets a mode of the interruption commander to the soft key input mode when the depressing detector detects a depressing start of the touch panel portion, and switches the mode of the interruption commander from the soft key input mode to the handwriting input mode when the input recognizer recognizes that a length of a trajectory which the depressing coordinate has moved from detection of the depressing start reaches a predetermined value.

\* \* \* \* \*